United States Patent
Kunimatsu et al.

(10) Patent No.: US 9,268,706 B2
(45) Date of Patent: Feb. 23, 2016

(54) INFORMATION PROCESSING DEVICE INCLUDING HOST DEVICE AND SEMICONDUCTOR MEMORY DEVICE HAVING PLURALITY OF ADDRESS CONVERSION INFORMATION

(75) Inventors: Atsushi Kunimatsu, Funabashi (JP); Kenichi Maeda, Kamakura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 526 days.

(21) Appl. No.: 13/561,392

(22) Filed: Jul. 30, 2012

(65) Prior Publication Data
US 2013/0191609 A1    Jul. 25, 2013

(30) Foreign Application Priority Data

Aug. 1, 2011    (JP) .................. 2011-168368
Nov. 17, 2011    (JP) .................. 2011-252001

(51) Int. Cl.
*G06F 12/00*    (2006.01)
*G06F 12/10*    (2006.01)
(Continued)

(52) U.S. Cl.
CPC ............ *G06F 12/10* (2013.01); *G06F 11/1458* (2013.01); *G06F 12/0246* (2013.01); *G06F 12/0292* (2013.01); *G06F 12/1027* (2013.01); *G06F 12/1081* (2013.01); *G06F 2212/7201* (2013.01)

(58) Field of Classification Search
CPC .............. G06F 2212/7201; G06F 12/1027; G06F 11/1458; G06F 12/0292; G06F 12/10; G06F 12/1081; G06F 12/0246; G11C 2029/1806

USPC ..................... 711/206, 162; 710/22
See application file for complete search history.

(56) References Cited

U.S. PATENT DOCUMENTS

| 5,239,646 A | 8/1993 | Kimura |
| 5,890,220 A * | 3/1999 | Mochida et al. ............... 711/206 |
| 6,728,800 B1 * | 4/2004 | Lee et al. .................. 710/54 |

(Continued)

FOREIGN PATENT DOCUMENTS

| CN | 101236483 A | 8/2008 |
| JP | 03-35313 A | 2/1991 |

(Continued)

OTHER PUBLICATIONS

Office Action issued Mar. 16, 2015 in Taiwanese Patent Application No. 101126675 (with English language translation).

(Continued)

*Primary Examiner* — Hong Kim
(74) *Attorney, Agent, or Firm* — Oblon, McClelland, Maier & Neustadt, L.L.P.

(57) ABSTRACT

A device includes a host including a main memory, and semiconductor memory including a nonvolatile semiconductor memory, memory unit, and controller. The nonvolatile semiconductor memory stores first address information. The memory unit stores second address information as part of the first address information. The controller accesses the nonvolatile semiconductor memory based on the second address information. Third address information is stored in the main memory, and is part or all of the first address information. The controller uses the third address information when accessing the nonvolatile semiconductor memory if address information to be referred is not stored in the second address information.

8 Claims, 11 Drawing Sheets

(51) Int. Cl.
*G06F 11/14* (2006.01)
*G06F 12/02* (2006.01)

(56) References Cited

U.S. PATENT DOCUMENTS

| | | | |
|---|---|---|---|
| 7,509,391 B1* | 3/2009 | Chauvel et al. | 709/214 |
| 8,745,309 B2* | 6/2014 | Jung et al. | 711/103 |
| 2002/0091903 A1 | 7/2002 | Mizuno | |
| 2003/0115414 A1* | 6/2003 | Tomita | 711/114 |
| 2008/0140897 A1* | 6/2008 | Ganguly | 710/268 |
| 2008/0189485 A1* | 8/2008 | Jung et al. | 711/115 |
| 2009/0113121 A1 | 4/2009 | Lee et al. | |
| 2010/0250836 A1 | 9/2010 | Sokolov et al. | |
| 2011/0258372 A1 | 10/2011 | Toyama et al. | |
| 2012/0265916 A1* | 10/2012 | Nordstrom et al. | 710/308 |

FOREIGN PATENT DOCUMENTS

| | | |
|---|---|---|
| JP | 10-105347 A | 4/1998 |
| JP | 10-269165 | 10/1998 |
| JP | 2000-3328 A | 1/2000 |
| JP | 2000-47891 A | 2/2000 |
| JP | 2001-195195 A | 7/2001 |
| JP | 2002-189572 A | 7/2002 |
| JP | 2002-207572 A | 7/2002 |
| JP | 2008-21290 A | 1/2008 |
| JP | 2010-76445 | 4/2010 |
| WO | WO 2011/013350 A1 | 2/2011 |

OTHER PUBLICATIONS

Office Action issued Jul. 3, 2015, in Chinese Patent Application No. 201210272624.X (with English language translation).

Office Action issued Oct. 7, 2014 in Japanese Patent Application No. 2011-252001 (with English language translation).

Office Action issued Oct. 31, 2014 in Chinese Patent Application No. 201210272624.X (with English language translation).

* cited by examiner

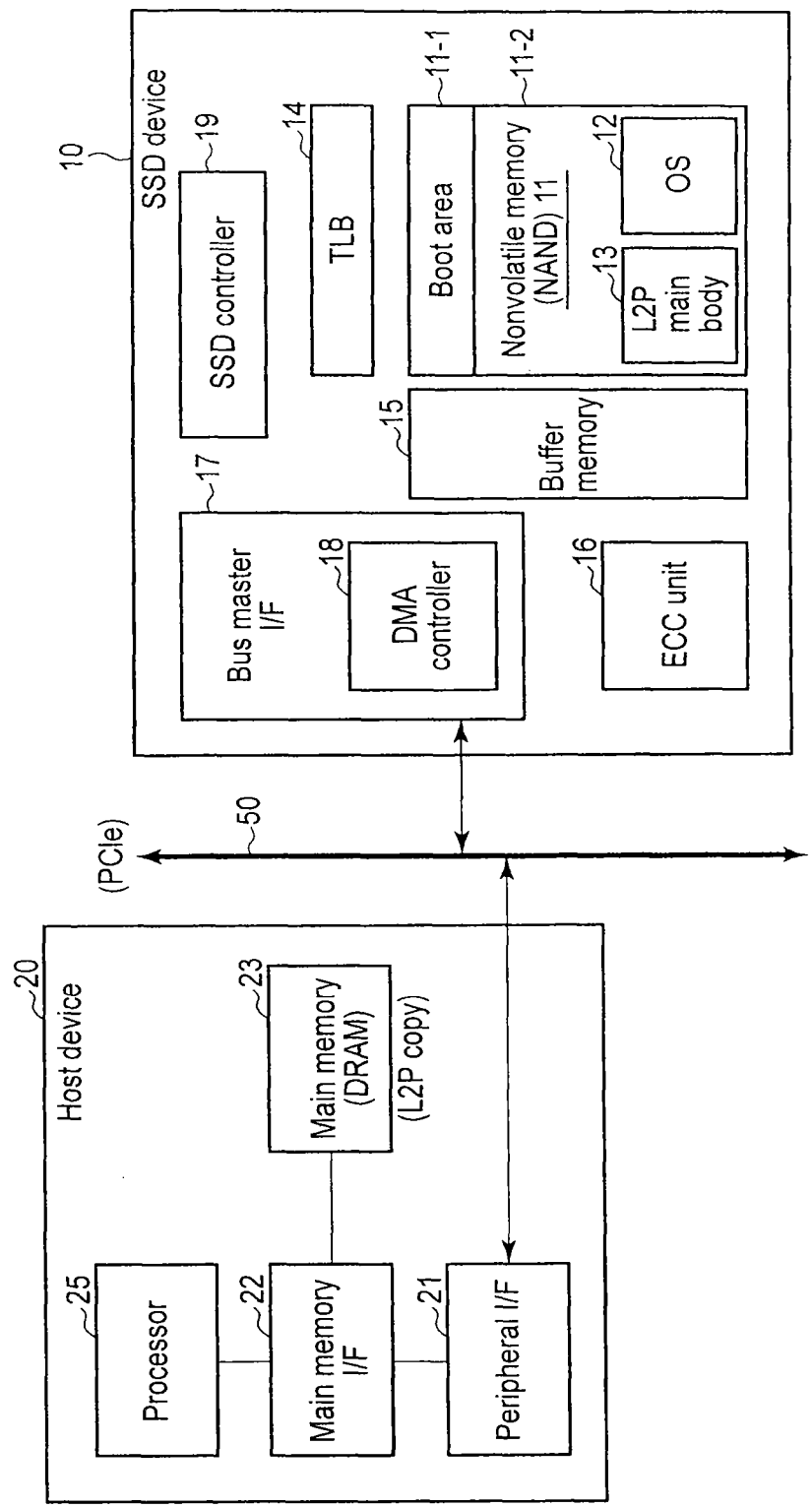
F I G. 1

(12)  United States Patent US 9,268,706 B2

INFORMATION PROCESSING DEVICE INCLUDING HOST DEVICE AND SEMICONDUCTOR MEMORY DEVICE HAVING PLURALITY OF ADDRESS CONVERSION INFORMATION

CROSS-REFERENCE TO RELATED APPLICATIONS

This application is based upon and claims the benefit of priority from Japanese Patent Applications No. 2011-168368, filed Aug. 1, 2011; and No. 2011-252001, filed Nov. 17, 2011, the entire contents of all of which are incorporated herein by reference.

FIELD

Embodiments described herein relate generally to an information processing device including a host device and semiconductor memory device, and to the semiconductor memory device.

BACKGROUND

A semiconductor memory device such as an SSD (Solid State Drive) often stores a logical-physical conversion table (MMU: to be also referred to as an L2P in some cases hereinafter) in, e.g., a buffer (memory) of the SSD. In this case, as a memory capacity of the SSD increases, a capacity and area of the buffer for storing the logical-physical conversion table tend to increase. Also, a manufacturing cost often increases because it is necessary to secure the capacity for storing the logical-physical conversion table in the buffer.

There is a technique called a UMA (Unified Memory Architecture). In the UMA, one memory is shared between a plurality of arithmetic processors. The UMA is used in a GPU (Graphical Processing Unit) or the like. The arithmetic processors are integrated in the GPU. The UMA can reduce the memory cost.

BRIEF DESCRIPTION OF THE DRAWINGS

FIG. 1 is a block diagram showing an example of an information processing device including a semiconductor memory device according to a first embodiment;

DETAILED DESCRIPTION

Figure 2:
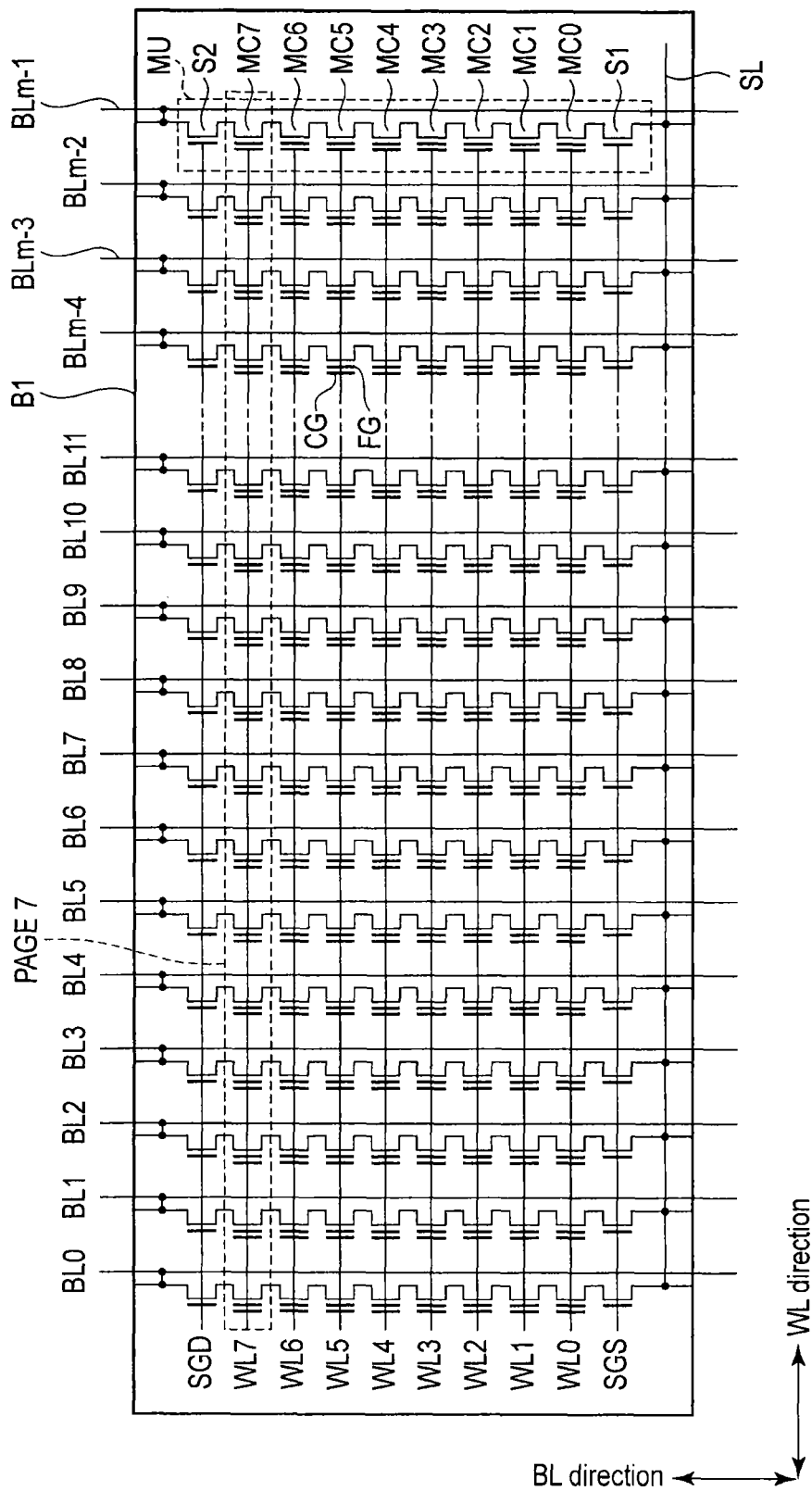
FIG. 2 is an equivalent circuit diagram showing an example of a block of a nonvolatile memory according to the first embodiment.

Each embodiment will be explained below with reference to the accompanying drawings. Note that in the following explanation, the same reference numerals denote the same or almost the same functions and constituent elements, and a repetitive explanation will be made as needed.

First Embodiment

In general, according to a first embodiment, an information processing device includes a host device and a semiconductor memory device. The host device includes a main memory. The semiconductor memory device includes a nonvolatile semiconductor memory, a memory unit, and a controller. The nonvolatile semiconductor memory stores first address conversion information and data. The memory unit stores second address conversion information. The second address conversion information is part of the first address conversion information. The controller accesses the nonvolatile semiconductor memory by referring to the second address conversion information. Third address conversion information is stored in the main memory. The third address conversion information is part of or all of the first address conversion information. The controller uses the third address conversion information when accessing the nonvolatile semiconductor memory if address conversion information to be referred is not stored in the second address conversion information.

1. Configuration Example

1-1. Example of Overall Configuration

First, an example of an overall configuration of a memory system including an SSD device according to the first embodiment will be explained below with reference to FIG. 1.

As shown in FIG. 1, an information processing device according to the first embodiment includes an SSD (Solid State Drive) device 10 and host device 20. The SSD device 10 is a device including a nonvolatile memory to which the same interface as that of an HDD (Hard Disc Drive) is applicable. A semiconductor memory device will be explained by taking the SSD device 10 as an example in the first embodiment, but the semiconductor memory device is not limited to the SSD device 10. Examples of the information processing devices are a personal computer, cell phone, and imaging device.

The SSD device 10 includes a nonvolatile memory (NVM) 11, TLB 14, buffer memory 15, ECC (Error Correcting Code) unit 16, bus master interface 17, DMA controller 18, and SSD controller 19. The nonvolatile memory 11 stores an OS (Operating System) 12 and logical-physical conversion table (L2P) 13. The logical-physical conversion table 13 is used as address conversion information.

For example, the host device 20 may an external device of the SSD device 10.

In the first embodiment, a NAND type flash memory is applied as the nonvolatile memory (NVM) 11. Although details will be explained later, the NAND type flash memory includes a plurality of blocks, and data read and write are performed for each page unit. For example, the NAND type flash memory includes a boot area 11-1 and a management area (or general area) 11-2 having a large capacity. Note that the nonvolatile memory 11 is not limited to the NAND type flash memory, and may also be, e.g., an MRAM (Magnetoresistive Random Access Memory) or NOR type flash memory.

The boot area 11-1 starts from a fixed address and has a capacity of about a 1 Gigabyte unit. Also, the boot area 11-1 holds a boot program similar to a boot ROM/BIOS. The management area 11-2 is an area which no general user can access, and the general area is an area which a general user can access.

The OS 12 is stored in the management area 11-2 of the NAND type flash memory, and functions as a control program of the host device 20. The OS 12 includes a driver for copying the logical-physical conversion table 13 to a main memory 23, and driving the SSD device 10.

The logical-physical conversion table (L2P) 13 is information by which a logical block address (LBA) to be used when the external host device 20 accesses the NAND type flash memory 11 is made to correspond to an actual physical block address (PBA) in the NAND type flash memory 11.

The logical block address (LBA) is a block address issued and managed by the host device 20. The physical block address (PBA) is an actual block address in the NAND type flash memory 11.

The TLB (Translation Look-aside Buffer) 14 is a buffer memory for caching a part of the logical-physical conversion table 13.

The buffer memory 15 stores small-volume data of an input and output of the NAND type flash memory as the nonvolatile memory 11. The buffer memory 15 is, e.g., an SRAM (Static Random Access Memory) of about an order of a few kB to a few hundred kB, and may also be a register or the like. The buffer memory 15 can be omitted if the NAND type flash memory 11 has an internal buffer memory.

The ECC unit 16 performs error check on readout data from the nonvolatile memory 11, and corrects an error if it is found.

The bus master interface 17 is a bus master of a bus (PCIe) 50 shown in FIG. 1, and includes the DMA controller 18.

The DMA controller 18 controls data transfer between the SSD device 10 and the main memory 23 of the host device 20. The DMA controller 18 has, e.g., a function of sequentially transferring data of a plurality of blocks to the host device 20 through the bus 50. In this embodiment, The DMA controller 18 transfers address conversion information from the main memory of the host device 20 to TLB 14.

The SSD controller 19 controls the arrangement explained above, and controls an overall operation of the SSD device 10. In a read operation, the SSD controller 19 refers to the TLB 14 in accordance with a read command, converts a logical block address into a physical block address, and reads out data stored at this physical block address from the nonvolatile memory 11. In a write operation, the SSD controller 19 refers to the TLB 14 in accordance with a write command, converts a logical block address into a physical block address, and writes data at this physical block address of the nonvolatile memory 11.

The host device 20 includes a peripheral interface 21, a main memory interface 22, the main memory 23, and a processor 25.

The peripheral interface 21 is an interface with the SSD device 10 as a peripheral device, and functions as a bridge of the bus 50.

The main memory interface 22 is an interface of the main memory 23.

The main memory 23 is a main storage device for storing data of the host device 20. In the first embodiment, a DRAM (Dynamic Random Access Memory) or the like is used as the main memory 23. Also, the main memory 23 according to the first embodiment stores a copy of (part of or all of) the logical-physical conversion table 13 described above. Details of the copy of the logical-physical conversion table 13 will be described later.

The processor 25 controls the arrangement explained above, and controls the operation of the host device 20. As the processor 25, it is possible to use, e.g., a central processing unit (CPU), microprocessor unit (MPU), or digital signal processor (DSP).

In this embodiment, the SSD controller 19 accesses the nonvolatile memory 11 by using the copy of the logical-physical conversion table 13 of the main memory 23 when accessing the nonvolatile memory 11 if address conversion information to be referred is not stored in the TLB 14.

1-2. Explanation of NAND Type Flash Memory

The nonvolatile memory 11 shown in FIG. 1 will be explained in more detail below with reference to FIG. 2. The explanation will be made by taking an equivalent circuit of block B1 including the NAND type flash memory as an example. Since data is erased at once from memory cells in block B1 the block B1 is a data erase unit.

Block B1 includes a plurality of memory cell units MU arranged in a word line direction (WL direction). Each memory cell unit MU includes a NAND string (memory cell string) including eight memory cells MC0 to MC7 that are arranged in a bit line direction (BL direction) perpendicular to the word line direction and have current paths connected in series, a source-side selection transistor S1 connected to one end of the current path of the NAND string, and a drain-side selection transistor S2 connected to the other end of the current path of the NAND string.

In the first embodiment, the memory cell unit MU includes the eight memory cells MC0 to MC7. However, the memory cell unit MU need only include two or more memory cells, so the number of memory cells is not limited to eight. For example, the number of memory cells in the memory cell unit MU may be 56, 32 or the like.

The other end of the current path of the source-side selection transistor S1 is connected to a source line SL. The other end of the current path of the drain-side selection transistor S2 corresponds to each memory cell unit MU, is formed above the memory cells MC0 to MC7 in each memory cell unit MU, and is connected to a bit line BLm-1 extending in the bit line direction.

Word lines WL0 to WL7 extend in the word line direction, and are each connected to control gate electrodes CG of a plurality of memory cells in the word line direction. A selection gate line SGS extends in the word line direction, and is connected to a plurality of selection transistors S1 in the word line direction. A selection gate line SGD also extends in the word line direction, and is connected to a plurality of selection transistors S2 in the word line direction.

A page (PAGE) exists for each of the word lines WL0 to WL7. For example, page 7 (PAGE 7) exists for the word line WL7 as indicated by the broken lines in FIG. 2. Since a data read operation and data write operation are performed for each page, the page is a data read unit and data write unit.

2. Operation

2-1. Boot Process

The boot operation of the memory system including the SSD device 10 according to the first embodiment will be explained below with reference to a flowchart shown in FIG. 3. Note that in the following operation, a step represented by a parallelogram is executed through the bus 50.

Figure 3:
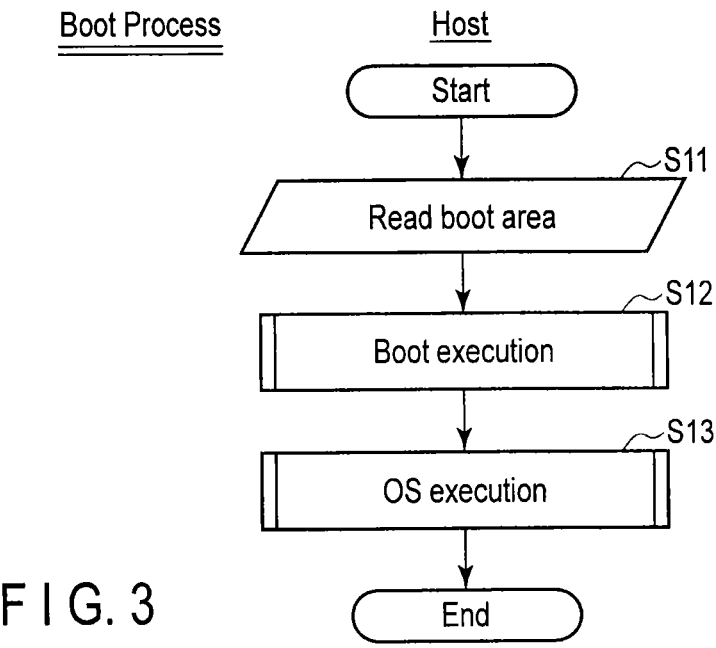
FIG. 3 is a flowchart showing an example of a boot operation according to the first embodiment.

First, in step S11 as shown in FIG. 3, the processor 25 of the host device 20 reads out the boot program stored in the boot area 11-1 of the nonvolatile memory 11 of the SSD device 10.

Then, in step S12, the processor 25 executes boot by using the boot program read out from the boot area 11-1. Details of this boot execution will be explained next with reference to FIG. 4.

Subsequently, in step S13, the processor 25 executes the loaded OS 12, and terminates the boot operation (End).

2-2. Boot Execution Process

Figure 4:
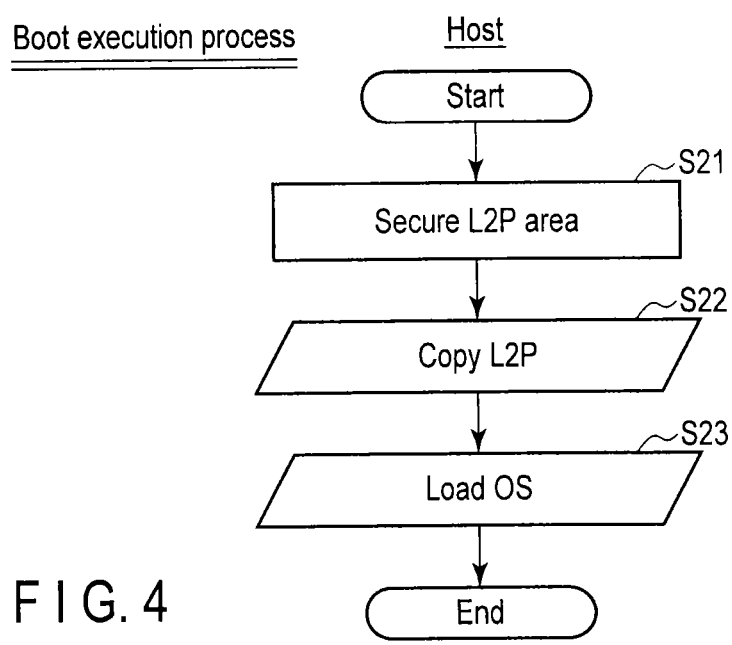
FIG. 4 is a flowchart showing an example of a boot executing operation included in the boot operation according to the first embodiment.

Next, the boot executing operation of the memory system including the SSD device 10 according to the first embodiment will be explained with reference to a flowchart shown in FIG. 4. FIG. 4 corresponds to the boot execution in step S12 of FIG. 3 described above.

First, in step S21 as shown in FIG. 4, the processor 25 of the host device 20 makes a declaration of the use of the main memory 23, and secures an area for storing a copy of the logical-physical conversion table 13 in the main memory 23.

Then, in step S22, the processor 25 reads out the logical-physical conversion table 13 stored in the nonvolatile memory 11, and stores, in the secured area of the main memory 23, the copy of the logical-physical conversion table 13 transferred through the bus 50. In the first embodiment, an example in which the logical-physical conversion table 13 is entirely copied to the main memory 23 will be explained. However, only a part of the logical-physical conversion table 13 may also be copied to the main memory 23. Details of this example in which only a part of the logical-physical conversion table 13 is copied to the main memory 23 will be explained in the second embodiment.

Subsequently, in step S23, the processor 25 similarly transfers and loads the OS 12 through the bus 50, and terminates this boot execution process (End).

2-3. TLB Process

The TLB operation of the memory system including the SSD device 10 according to the first embodiment will be explained below with reference to a flowchart shown in FIG. 5. The TLB operation uses the copy of the logical-physical conversion table 13 transferred to the main memory 23 of the host device 20 by the above-mentioned boot operation.

Figure 5:
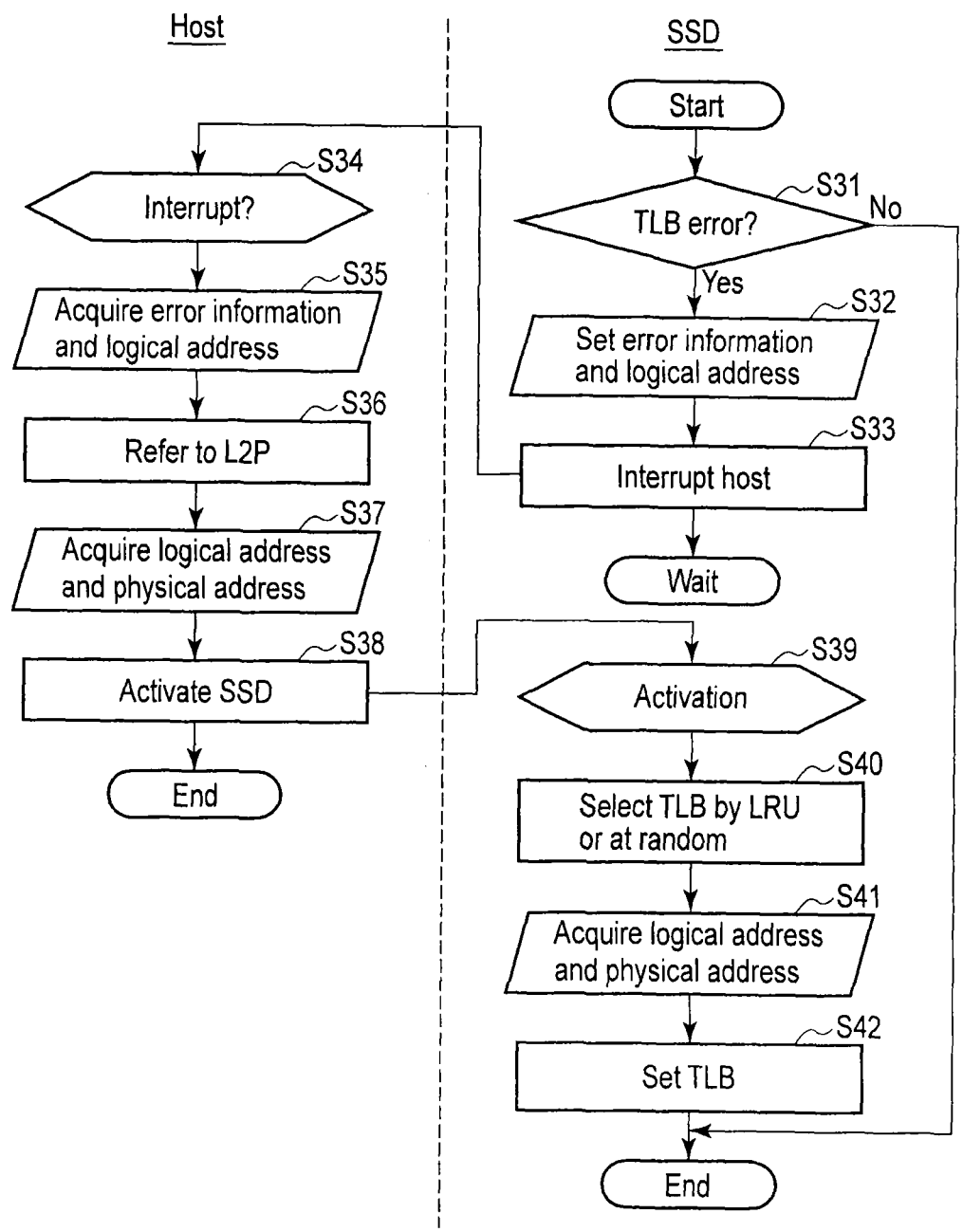
FIG. 5 is a flowchart showing an example of a TLB operation according to the first embodiment.

First, in step S31 as shown in FIG. 5, the SSD controller 19 of the SSD device 10 determines whether a corresponding logical address exists in the TLB 14. If the corresponding logical address exists in the TLB 14 and no TLB error occurs (No), the SSD controller 19 terminates the operation (End).

On the other hand, if the corresponding logical address does not exist in the TLB 14 and a TLB error occurs (Yes), the process advances to step S32.

In step S32, the SSD controller 19 sets error information indicating the TLB error and a corresponding logical address.

In step S33, the SSD controller 19 transmits an interrupt to the host device 20. After that, the SSD device 10 waits until the host device 20 sends an instruction to activate the SSD device 10.

In step S34, the processor 25 of the host device 20 receives the interrupt from the SSD device 10, and executes the following processing.

First, in step S35, the processor 25 acquires the set and transferred error information and above-mentioned corresponding logical address.

Then, in step S36, the processor 25 refers to the copy of the logical-physical conversion table 13 stored in the main memory 23.

Subsequently, in step S37, the processor 25 acquires a physical address corresponding to the logical address.

In step S38, the processor 25 transfers the acquired logical address and corresponding physical address to the SSD device 10, and gives an activation instruction to the SSD device 10 in the wait state.

In step S39, the SSD controller 19 of the SSD device 10 receives the activation instruction from the host device 20, and starts activating again from the wait state.

In step S40, the SSD controller 19 selects an entry of the TLB 14 by LRU (Least Recently Used) or at random. LRU is to select an oldest accessed entry.

In step S41, the SSD controller 19 acquires the corresponding logical address and physical address transferred from the host device 20.

In step S42, the SSD controller 19 sets (by replacement or copying) the logical address and physical address in the entry of the TLB 14 selected in step S40, and terminates the operation (End).

As described above, the SSD controller 19 executes an interrupt to the host device 20 when address conversion information to be referred is not stored in the TLB 14 and acquires the address conversion information to be referred from the copy of the logical-physical conversion table 13 stored in the main memory 23 of the host device 20. Furthermore, the SSD controller 19 refers to address conversion information to be referred transferred from the main memory 23 to the TLB 14 when the SSD controller 19 uses the copy of the logical-physical conversion table 13 stored in the main memory 23 of the host device 20.

2-1. DMA Process

The DMA (Dynamic Memory Access) operation of the memory system including the SSD device 10 according to the first embodiment will be explained below with reference to a flowchart shown in FIG. 6. This DMA operation is performed by using the copy of the logical-physical conversion table 13 transferred to the host device 20 by the above-mentioned boot operation, and corresponds to the above-mentioned TLB process.

Figure 6:
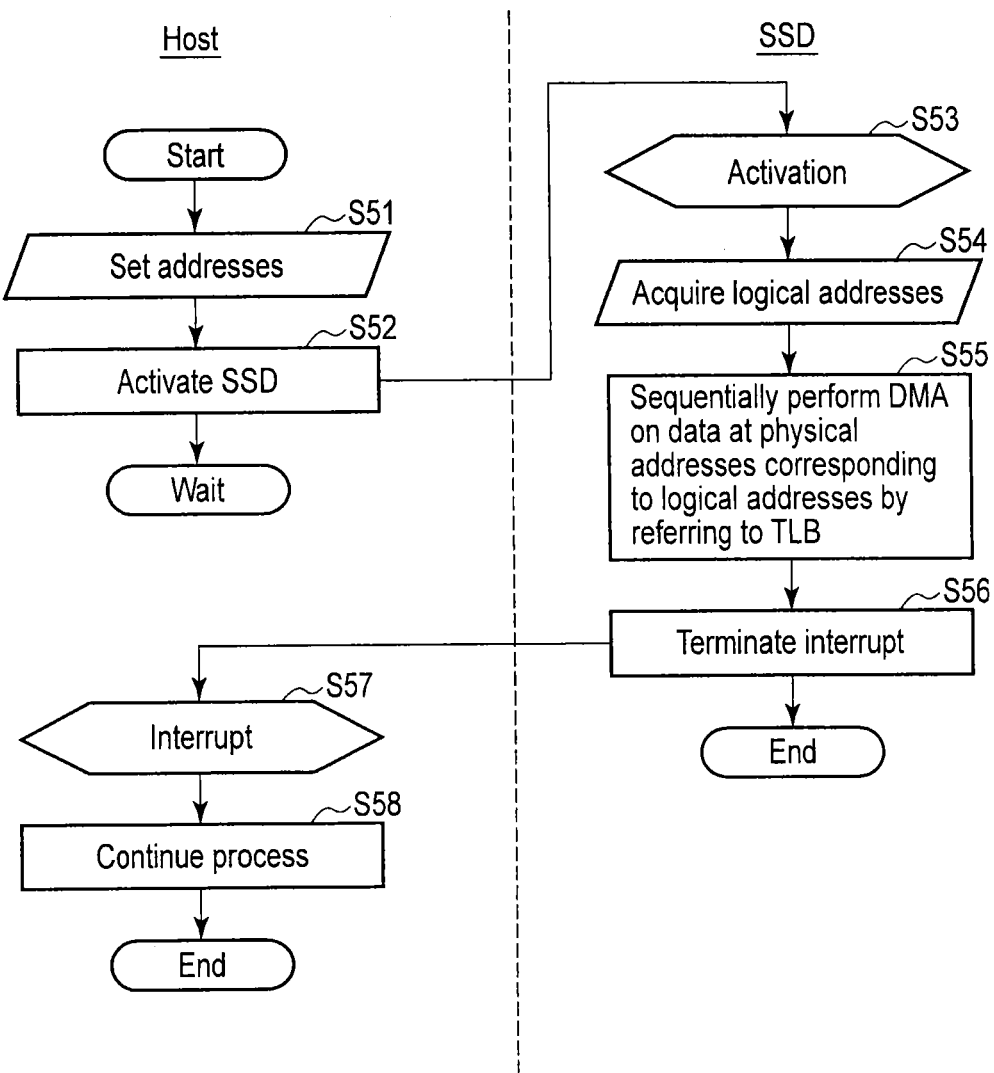
FIG. 6 is a flowchart showing an example of a DMA (Dynamic memory access) operation according to the first embodiment.

First, in step S51 as shown in FIG. 6, the processor 25 of the host device 20 refers to the copy of the logical-physical conversion table 13, and sets a plurality of necessary logical addresses.

Then, in step S52, the processor 25 transfers the selected logical addresses, and gives an activation instruction to the SSD device 10. After that, the host device 20 waits until the SSD device 10 issues an interrupt instruction.

Subsequently, in step S53, the SSD controller 19 of the SSD device 10 receives the activation instruction from the host device 20, and activates the SSD device 10.

In step S54, the SSD controller 19 acquires the transferred logical addresses.

In step S55, the SSD controller 19 refers to the logical-physical conversion table 13 stored in the TLB 14, and sequentially transfers (by DMA) data stored at physical addresses corresponding to the logical addresses by using the bus master interface 17. This transfer may include both read and write.

In step S56, the SSD controller 19 gives the host device 20 an interrupt indicating the end of the transferred data.

In step S57, the processor 25 of the host device 20 receives the interrupt, and starts the interrupt operation again from the wait state.

In step S58, the processor 25 uses the transferred data in a read operation, or continues the processing in a write operation, and terminates the operation (End).

3. Effects

The semiconductor memory device and the system (information processing device) including the device according to the first embodiment achieves at least effects (1) and (2) below.

(1) A capacity and area of the buffer memory 15 of the SSD device 10 can be reduced.

As described above, the SSD controller 19 of the SSD device 10 according to the first embodiment transfers a copy of the logical-physical conversion table 13 to the host device 20 through the bus 50.

Subsequently, the processor 25 of the host device 20 makes a declaration of the use of the main memory 23, and secures an area for storing the copy of the logical-physical conversion table 13 in the DRAM as the main memory 23 (S21). Then, the processor 25 stores the copy of the logical-physical conversion table 13 transferred through the bus 50 in the secured area of the main memory 23 (S22). After that, the processor 25 loads the OS 12 as a control program of the host device 20, which is transferred through the bus 50, and terminates the boot execution process.

Consequently, the copy of the logical-physical conversion table 13 is placed on the main memory 23 of the host device 20. This copy of the logical-physical conversion table 13 stored in the main memory 23 of the host device 20 is used as needed in the TLB operation shown in FIG. 5. For example, the copy of the logical-physical conversion table 13 stored in the main memory 23 is used as needed when, e.g., a corresponding logical address does not exist in the TLB 14 and a TLB error occurs (Yes). In this case, it is unnecessary to refer to a main body of the logical-physical conversion table (L2P) 13. This enables a high-speed operation almost equal to that when a large amount of buffers are formed in the SSD device 10. In addition, since there is no large amount of buffers, the operation can be implemented with a very small amount of hardware.

In the first embodiment, it is possible to reduce the capacity and occupied area of the buffer memory 15 for storing the logical-physical conversion table 13 of the SSD device 10.

Even in an arrangement in which the copy of the logical-physical conversion table 13 is placed on the main memory 23 of the host device 20, the SSD device 10 preferably includes high-speed processes such as TLB, DMA, and ECC in the first embodiment. The scale of the circuit for executing these processes is extremely smaller than that of a buffer memory for storing the whole logical-physical conversion table 13.

(2) The manufacturing cost can be reduced.

The manufacturing cost of the buffer memory 15 is higher than that of the DRAM as the main memory 23 of the host device 20.

In this embodiment as described above, the capacity and occupied area of the buffer 15 for storing the logical-physical conversion table 13 of the SSD device 10 are reduced, and a copy of the logical-physical conversion table 13 is placed on the main memory 23 of the host device 20. Therefore, the manufacturing cost can be reduced.

Second Embodiment

The second embodiment will now be explained. A memory system of the second embodiment has the same arrangement as that of the memory system of the first embodiment shown in FIG. 1. In the first embodiment, the main memory 23 holds a copy of the logical-physical conversion table 13. The second embodiment differs from the first embodiment in that a main memory 23 holds a copy of a part of a logical-physical conversion table 13. The second embodiment also differs from the first embodiment in a boot executing operation and TLB process as will be described later. In the following explanation of the second embodiment, a detailed explanation of the same features as those of the first embodiment will be omitted.

<TLB Process>

First, the TLB operation of the second embodiment will be explained below with reference to FIG. 7.

The TLB operation of this embodiment differs from only step S36 of the TLB operation shown in FIG. 5 in the first embodiment. That is, in the first embodiment, no L2P error occurs in step S36 because the main memory 23 has a copy of the logical-physical conversion table (L2P) 13. In the second embodiment, however, an L2P error may occur in step S36 because a copy of only a part of the L2P 13 is stored in the main memory 23.

Figure 7:
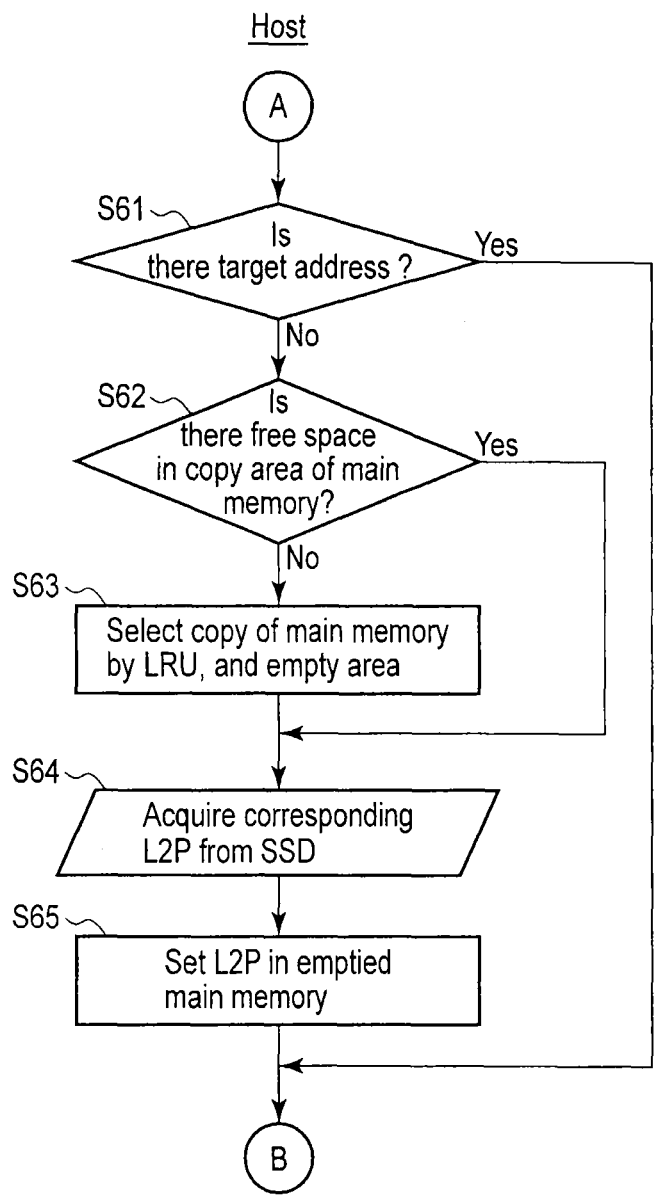
FIG. 7 is a flowchart showing an example of a TLB operation according to a second embodiment.

In the second embodiment, therefore, processing to be performed when an L2P error occurs is necessary, and the operation in step S36 is executed in accordance with a flowchart from (A) to (B) shown in FIG. 7.

First, in step S61 as shown in FIG. 7, a processor 25 of a host device 20 determines whether address conversion information to be referred (a corresponding part of a logical-physical conversion table (L2P) 13) exists in the main memory 23. If the address conversion information to be referred exists in the main memory 23 (Yes), the processor 25 terminates this process (End).

If it is determined in step S61 that there is no address conversion information to be referred in the main memory 23 (No), the processor 25 determines in step S62 whether there is a free space in the copy area of the main memory 23. If there is a free space in the copy area of the main memory 23 (Yes), the process advances to step S64.

If it is determined in step S62 that there is no free space in the copy area of the main memory 23 (No), the process advances to step S63, and the processor 25 selects an area of the main memory 23 in accordance with the above-mentioned LRU, and empties the area.

Then, in step S64, the processor 25 acquires the address conversion information to be referred from the SSD device 10.

Subsequently, in step S65, the processor 25 sets the acquired address conversion information to be referred in the free area formed in the main memory 23, and terminates the process (B).

In this embodiment as described above, the host device 20 acquires address conversion information referred by the SSD controller 19 from the logical-physical conversion table 13 of the nonvolatile memory 11 when the address conversion information referred by the SSD controller 19 is not stored in the main memory 23.

<Boot Execution Process>

Figure 8:
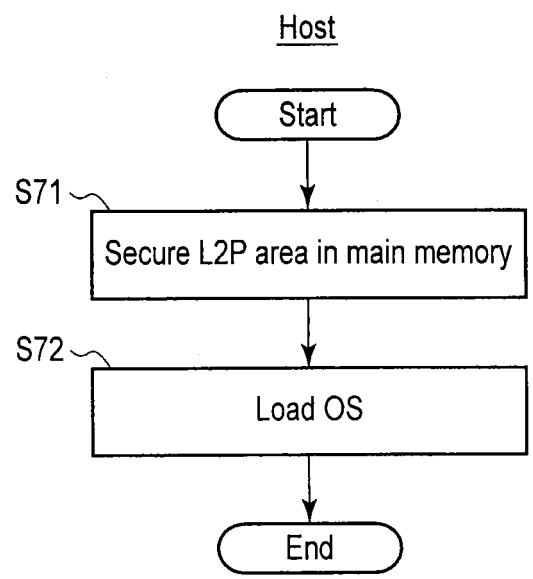
FIG. 8 is a flowchart showing an example of a boot executing operation according to the second embodiment.

Next, the boot executing operation of the second embodiment will be explained with reference to FIG. 8. The boot executing operation of the second embodiment differs from that of the first embodiment shown in FIG. 4 in that the L2P copy step (step 22 in FIG. 4) is omitted.

First, in step S71, the processor 25 of the host device 20 makes a declaration of the use of the main memory 23, and secures an area for storing a copy of the logical-physical conversion table 13 in the main memory 23.

Then, in step S72, the processor 25 loads an OS 12 transferred through a bus 50. Since no copy of the logical-physical conversion table 13 is stored in the main memory 23, an L2P error occurs in the main memory 23. Even when an L2P error thus occurs in the boot operation, this L2P error can be eliminated by executing the process shown in FIG. 7 described above.

<Effects>

The semiconductor memory device and the system (information processing device) including the device according to the second embodiment achieves at least the effects (1) and (2) described previously. In addition, the above-mentioned arrangements and operations can be applied as needed in the second embodiment.

Third Embodiment

In general, according to a third embodiment, an information processing device includes a host device and a semiconductor memory device. The host device includes a main memory and a first controller. The first controller separates a write request for the semiconductor memory device into a write command and write data corresponding to the write command, outputs the write command to the semiconductor memory device, and stores the write data in the main memory. The semiconductor memory device includes a nonvolatile semiconductor memory and a second controller. The second controller receives the write command transferred from the host device, and, when executing the write command, acquires the write data corresponding to the write command from the main memory, and writes the write data in the nonvolatile semiconductor memory.

Figure 9:
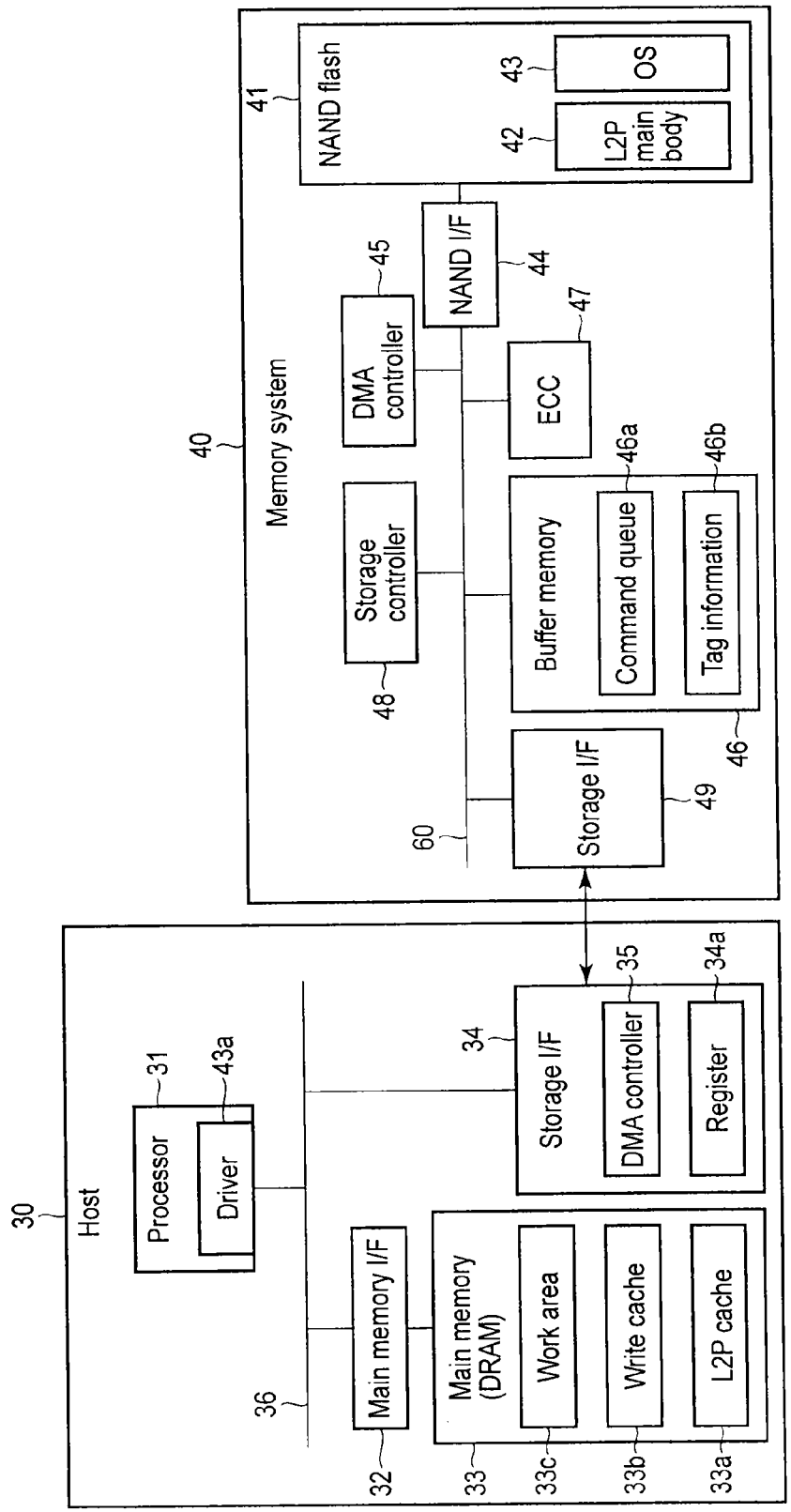
FIG. 9 is a block diagram showing an example of an arrangement of an information processing device according to a third embodiment.

FIG. 9 shows an example of an arrangement of an information processing device of the third embodiment. This information processing device includes a host device (to be abbreviated as a host hereinafter) 30, and a memory system (semiconductor memory device) 40 that functions as a storage device of the host 30. The memory system 40 may also be an embedded flash memory complying with the eMMC (embedded Multi Media Card) standards, or an SSD (Solid State Drive). The information processing device may be, e.g., a personal computer, cell phone, or imaging device.

The memory system 40 includes a NAND flash 41 as a nonvolatile semiconductor memory, a NAND interface 44, a DMA controller 45, a buffer memory 46, an ECC circuit 47, a storage controller 48, and a storage interface 49.

The NAND flash 41 includes a memory cell array in which a plurality of memory cells are arranged in a matrix. Each memory cell can store multilevel data by using a high-order page and low-order page. The NAND flash 41 is formed by arranging a plurality of blocks as data erase units. Each block includes a plurality of pages. Each page is a unit of data write and read. The NAND flash 41 is formed by, e.g., a plurality of memory chips.

The NAND flash 41 stores user data transmitted from the host 30, management information of the memory system 40, and an OS 43 to be used by the host 30.

The OS 43 functions as a control program of the host 30.

A logical-physical conversion table (L2P table) 42 is address conversion information by which a logical block address (LBA) to be used when the host 30 accesses the memory system 40 is made to correspond to a physical address (block address+page address+storage position in page) in the NAND flash 41. The L2P table 42 stored in the NAND flash 41 will be called an L2P main body hereinafter.

The NAND interface 44 executes read/write of data and management information on the NAND flash 41 based on a control of the storage controller 48.

The buffer memory 46 is used as a buffer for storing data to be written in the NAND flash 41, or data read out from the NAND flash 41. The buffer memory 46 also stores a command queue 46a for queuing a command for a write request or read request input from the host 30, and tag information 46b of L2P information cached in a main memory 33 (to be described later) of the host 30. The buffer memory 46 is formed by, e.g., an SRAM or DRAM, but may also be formed by a register or the like.

The ECC circuit 47 performs an encoding process of ECC processing (an error correcting process) on data transferred from the buffer memory 46 and scheduled to be written in the NAND flash 41, and outputs the data to the NAND interface 44 by adding the encoding result to the data. Also, the ECC circuit 47 performs a decoding process (an error correcting process using an error correcting code) of ECC processing on data read out from the NAND flash 41 via the NAND interface 44, and outputs the error-corrected data to the buffer memory 46.

The DMA controller 45 controls data transfer between the NAND interface 44, ECC circuit 47, and buffer memory 46. Note that the DMA controller 45 may control data transmission between a register 34a in a storage interface 34 of the host 30 and the buffer memory 46, but the storage interface 49 controls this data transmission between the register 34a and buffer memory 46 in the third embodiment.

The storage interface 49 is an interface for connecting the memory system 40 and host 30. The storage interface 49 has a function of controlling data transmission between the register 34a in the storage interface 34 of the host 30 and the buffer memory 46 of the memory system 40.

The function of the storage controller 48 is implemented by executing firmware. The storage controller 48 comprehensively controls the constituent elements in the memory system 40 connected to a bus 60.

In the memory system 40, the relationship between a logical address (LBA) and a physical address (a storage position in the NAND flash 41) is not statistically determined, but dynamically determined when writing data. For example, the following processing is performed when overwriting data at the same LBA. Assume that valid block-size data is allocated to logical address A1, and block B1 of the NAND flash 41 is used as a memory area. When a command for overwriting block-size update data at logical address A1 is received from the host 30, an unused free block (block B2) in the NAND flash 41 is secured, and data received from the host 30 is written in the free block. After that, logical address A1 and block B2 are associated with each other. Consequently, block B2 becomes an active block including valid data. The data saved in block B1 is invalidated, and block B1 becomes a free block.

In the memory system 40 as described above, even for data at the same logical address A1, a block to be actually used as a recording area changes whenever data is written. Note that when writing block-size update data, a write destination block always changes. However, when writing update data smaller than the block size, the update data may be written in the same block. For example, when updating page data smaller than the block size, old page data at the same logical address is invalidated and newly written latest page data is managed as a valid page in the same block. When all data in a block are invalidated, the block is released as a free block.

Also, block rearrangement is executed in the memory system 40. If a data erase unit (block) and data management unit are different in the memory system 40, invalid (non-latest) data makes holes in blocks as rewrite of the NAND flash 41 advances. If these blocks having holes increase, usable blocks practically reduce, and this makes it impossible to effectively utilize the memory area of the NAND flash 41. Therefore, if the number of free blocks in the NAND flash 41 becomes smaller than a predetermined threshold value, block rearrangement such as compaction and garbage collection by which latest valid data are collected and rewritten in different blocks is executed, thereby securing free blocks.

Furthermore, when updating a partial sector in a page, the memory system 40 executes read-modify-write (RMW) by which stored data in the NAND flash 41 is read out, changed, and rewritten in the NAND flash 41. In this RMW process, a page or block including a sector to be updated is first read out from the NAND flash 41, and the readout data is integrated with write data received from the host 30. Then, the integrated data is written in a new page or new block of the NAND flash 41.

The host 30 includes a processor 31, a main memory interface 32, the main memory 33, the storage interface 34, and a bus 36 for connecting these components. The main memory interface 32 is an interface for connecting the main memory 33 to the bus 36.

The main memory 33 is a main storage device which the processor 31 can directly access. In the third embodiment, a DRAM (Dynamic Random Access Memory) is used. The main memory 33 functions as a main memory of the processor 31, and is used as a storage area for an L2P cache 33a and write cache 33b. The main memory 33 is also used as a work area 33c. The L2P cache 33a is a part or the whole of the L2P main body 42 stored in the NAND flash 41 of the memory system 40. The storage controller 48 of the memory system 40 performs address resolution when accessing data stored in the NAND flash 41, by using the L2P cache 33a cached in the main memory 33 and the L2P main body 42 stored in the NAND flash 41.

The write cache 33b temporarily stores write data to be written in the memory system 40 from the host 30. The work area 33c is used when writing data in the NAND flash 41. More specifically, the work area 33c is used when executing the block rearrangement or RMW described above.

The storage interface 34 is an interface for connecting to the memory system 40. The storage interface 34 includes a DMA controller 35 and the register 34a. The DMA controller 35 controls data transfer between the register 34a in the storage interface 34, and the L2P cache 33a, write cache 33b and work area 33c in the main memory 33.

The processor 31 controls the operation of the host 30, and executes the OS 43 loaded in the main memory 33 from the NAND flash 41. The OS 43 includes a device driver 43a for controlling the memory system 40. When accepting a write request to the memory system 40 from the OS 43 or an application on the OS 43, the device driver 43a separates the write request into a write command and write data. The command includes, e.g., a field for identifying a command type (e.g., read or write), a field for designating a start LBA, and a field for designating a data length. The device driver 43a transmits the command to the memory system 40 via the storage interface 34. On the other hand, the device driver 43a temporarily stores the separated data in the write cache 33b of the main memory 33.

Figure 10:
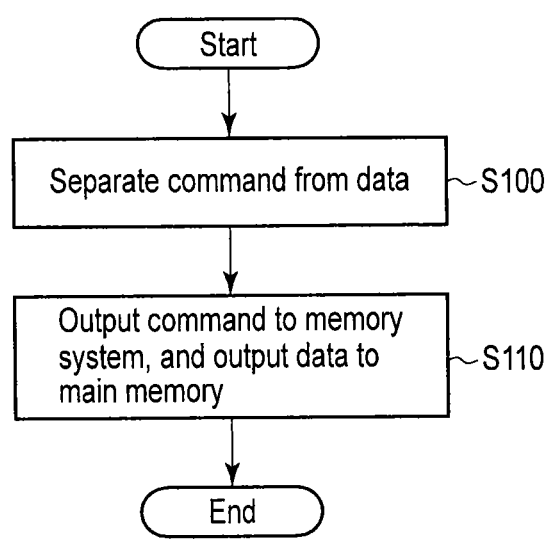
FIG. 10 is a flowchart showing an example of an operation of the information processing device in a write process according to the third embodiment.

FIG. 10 shows an example of an operation procedure of the device driver 43a when accepting a write request. When accepting a write request to the memory system 40 from the OS 43 or an application on the OS 43, the device driver 43a separates the write request into a command and data (step S100). Then, the device driver 43a directly transmits the command to the memory system 40 via the storage interface 34. Also, the device driver 43a temporarily stores the separated data in the write cache 33b of the main memory 33 (step S110). This data cached in the write cache 33b is transferred to the memory system 40 after that based on a control of the storage controller 48 of the memory system 40.

Figure 11:
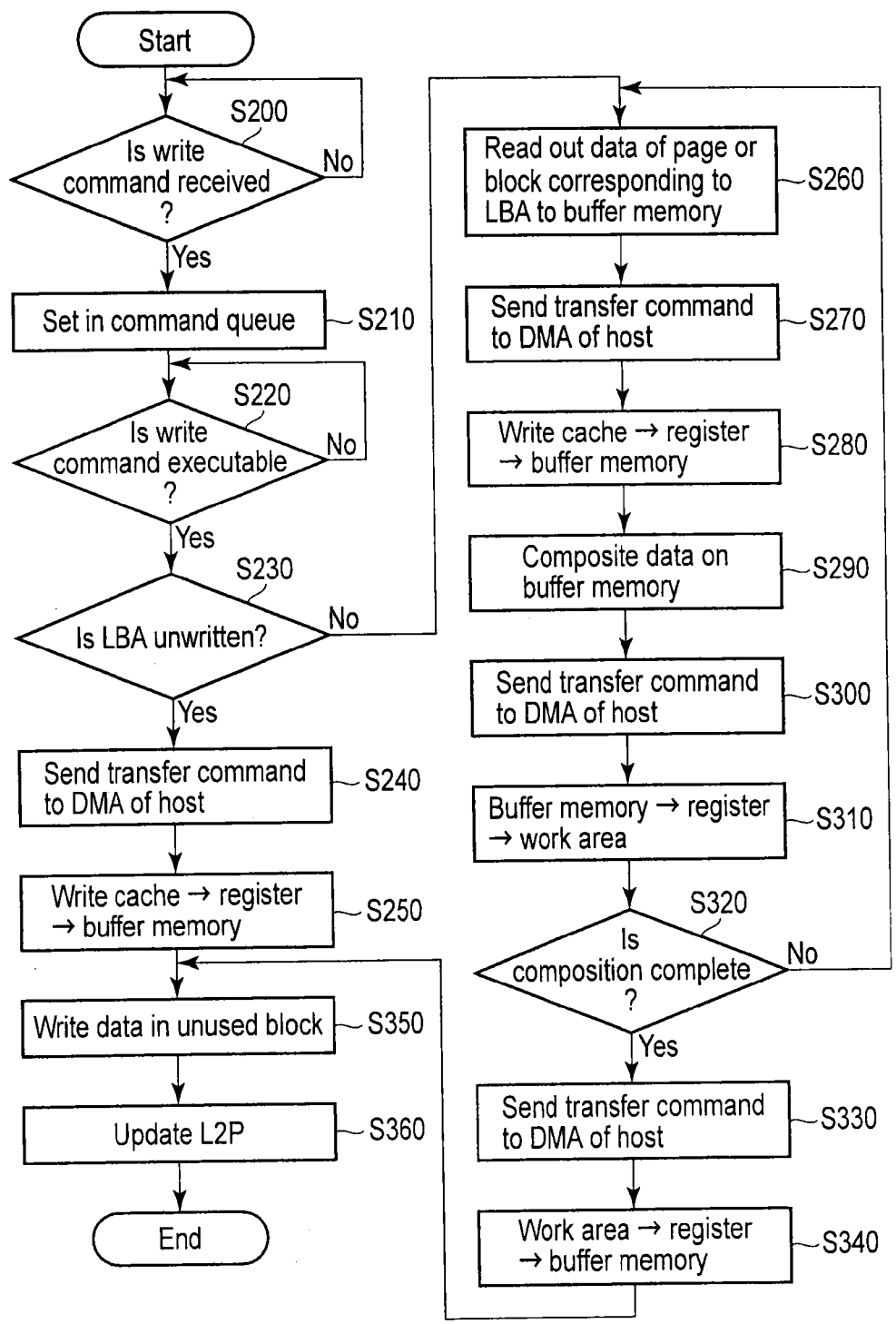
FIG. 11 is a flowchart showing an example of operations of a semiconductor memory device and the information processing device in the write process according to the third embodiment.

FIG. 11 shows an example of an operation procedure of the memory system 40 when a write command is received. The memory system 40 receives a write command transmitted from the host 30 (step S200). The storage interface 49 sets the received write command in the command queue 46a of the buffer memory 46 (step S210). When the turn of execution of the write command set in the command queue 46a comes and the write command becomes executable (step S220), the storage controller 48 determines whether an LBA included in the write command is unwritten (step S230). "An LBA is unwritten" herein mentioned means a state in which valid data corresponding to the LBA is not stored in the NAND flash 41.

More specifically, whether the LBA is unwritten is determined by, e.g., the following procedure. That is, the storage controller 48 determines whether the LBA included in the write command hits the tag information 46b. If the LBA does not hit, the storage controller 48 determines whether the LBA hits the L2P main body 42 stored in the NAND flash 41. Note that the tag information 46b is data in which the L2P information cached in the L2P cache 33b of the main memory 33 of the host 30 is registered. Whether L2P information corresponding to the LBA is stored in the L2P cache 33b can be determined by searching the tag information 46b.

If it is determined that the LBA does not hit by thus searching the tag information 46b and L2P main body 42 (Yes in step S230), the storage controller 48 outputs, to the DMA controller 35 of the host 30, a data transfer command for transferring write data corresponding to the write command from the write cache 33b (step S240). The DMA controller 35 which received this data transfer command transfers write data stored in the write cache 33b of the main memory 33 to the register 34a of the storage interface 34 from the write cache 33b of the main memory 33. When the data is set in the register 34a, the storage interface 34 notifies the storage interface 49 of the setting of the data, and the storage interface 49 which received the notification transfers the write data set in the register 34a to the buffer memory 46 (step S250).

The write command may also include a storage position in the main memory 33, so that the storage controller 48 can specify the storage position of the write data stored in the write cache 33b on the main memory 33. It is also possible to allow the storage controller 48 to specify the storage position of the write data by giving the write cache 33b an FIFO structure or ring buffer structure. That is, write data is set in the write cache 33b having the FIFO structure in the order of the generation of write commands. Since the write command includes the data length, the storage controller 48 can grasp the storage position of write data on the main memory 33 by adding the data length to an address whenever a write command is received, as long as the storage controller 48 recognizes an initial address of the write cache 33b having the FIFO structure.

When the write data is set in the buffer memory 46 by the processing in step S250, the storage controller 48 causes the ECC circuit 47 to perform ECC encoding on the write data, and writes the encoded data in a free block of the NAND flash via the NAND interface 44 (step S350). After that, the L2P cache 33a, tag information 46b, and L2P main body 42 are updated so that the LBA designated by the write command corresponds to the free block (step S360). Note that it is also possible to periodically update the L2P main body 42, instead of updating the L2P main body 42 whenever data is written in the NAND flash 41.

The L2P cache 33a is updated as follows. After forming new L2P information on the buffer memory 46, the storage controller 48 adds tag information of the new L2P information to the tag information 46b of the buffer memory 46, and notifies the storage interface 49 of the addition of the tag information. Also, the storage controller 48 outputs, to the DMA controller 35 of the host 30, a transfer command for transferring the L2P information. The storage interface 49 sets the new L2P information formed on the buffer memory 46 in the register 34a of the storage interface 34. The DMA controller 35 transfers the L2P information set in the register 34a to the main memory 33, and caches the L2P information in the L2P cache 33a.

On the other hand, if the LBA included in the write command hits the tag information 46b in step S230 (No in step S230), the storage controller 48 outputs an L2P information transfer command to the DMA controller 35 of the host 30. The DMA controller 35 transfers the hit L2P information stored in the L2P cache 33a of the main memory 33 from the main memory 33 to the register 34a of the storage interface 34. As described previously, when the data is set in the register 34a, the storage interface 34 notifies the storage interface 49 of the setting of the data, and the storage interface 49 which received this notification transfers the L2P information set in the register 34a to the buffer memory 46. The storage controller 48 performs address resolution by using the L2P information transferred to the buffer memory 46.

Then, the storage controller 48 reads out, from the NAND flash 41, a page or block including data stored in a physical address corresponding to the LBA obtained by the address resolution, and transfers the readout page or block to the buffer memory 46 (step S260). Subsequently, the storage controller 48 outputs, to the DMA controller 35 of the host 30, a data transfer command for transferring the write data stored in the write cache 33b (step S270). The DMA controller 35 which received this data transfer command transfers the write data stored in the write cache 33b of the main memory 33 from the main memory 33 to the register 34a of the storage interface 34. The storage interface 49 transfers this data set in the register 34a to the buffer memory 46 in the same manner as described above (step S280).

The storage controller 48 then composites, on the buffer memory 46, the data read out from the NAND flash 41 and written in the buffer memory 46 and the data transferred from the write cache 33b and written in the buffer memory 46 (step S290). When this composition is complete, the storage controller 48 notifies the storage interface 49 of the completion of the composition, and outputs, to the DMA controller 35 of the host 30, a transfer command for transferring the data (step S300). The storage interface 49 sets the data composited on the buffer memory 46 in the register 34a of the storage interface 34. The DMA controller 35 transfers the composited data set in the register 34a to the main memory 33, and stores the composited data in the work area 33c (step S310).

After that, the storage controller 48 determines whether the data composition process is complete (step S320). If the data composition process is not complete, the storage controller 48 repeats the procedure in steps S260 to S310 until the data composition process is complete, thereby forming as many block data as possible on the work area 33c of the main memory 33.

When the data composition process is complete, the storage controller 48 outputs, to the DMA controller 35 of the host 30, a data transfer command for transferring the composited data stored in the work area 33c of the main memory 33 (step S330). The DMA controller 35 which received this data transfer command transfers the composited data stored in the work area 33c of the main memory 33 from the main memory 33 to the register 34a of the storage interface 34. The storage interface 49 transfers this data set in the register 34a to the buffer memory 46 in the same way as described previously (step S340).

When the composited data is set in the buffer memory 46 by the processing in step S340, the storage controller 48 causes the ECC circuit 47 to perform ECC encoding on the write data, and writes the encoded data in a free block of the NAND flash 41 via the NAND interface 44 (step S350). After that, the storage controller 48 makes the LBA correspond to this free block, and updates the L2P cache 33a, tag information 46b, and L2P main body 42 so as to invalidate the old active block (step S360).

Note that if the composition process is complete by performing data transfer once from the main memory 33 to the buffer memory 46, the data composited on the buffer memory 46 may also be written directly in the NAND flash 41.

Figure 12:
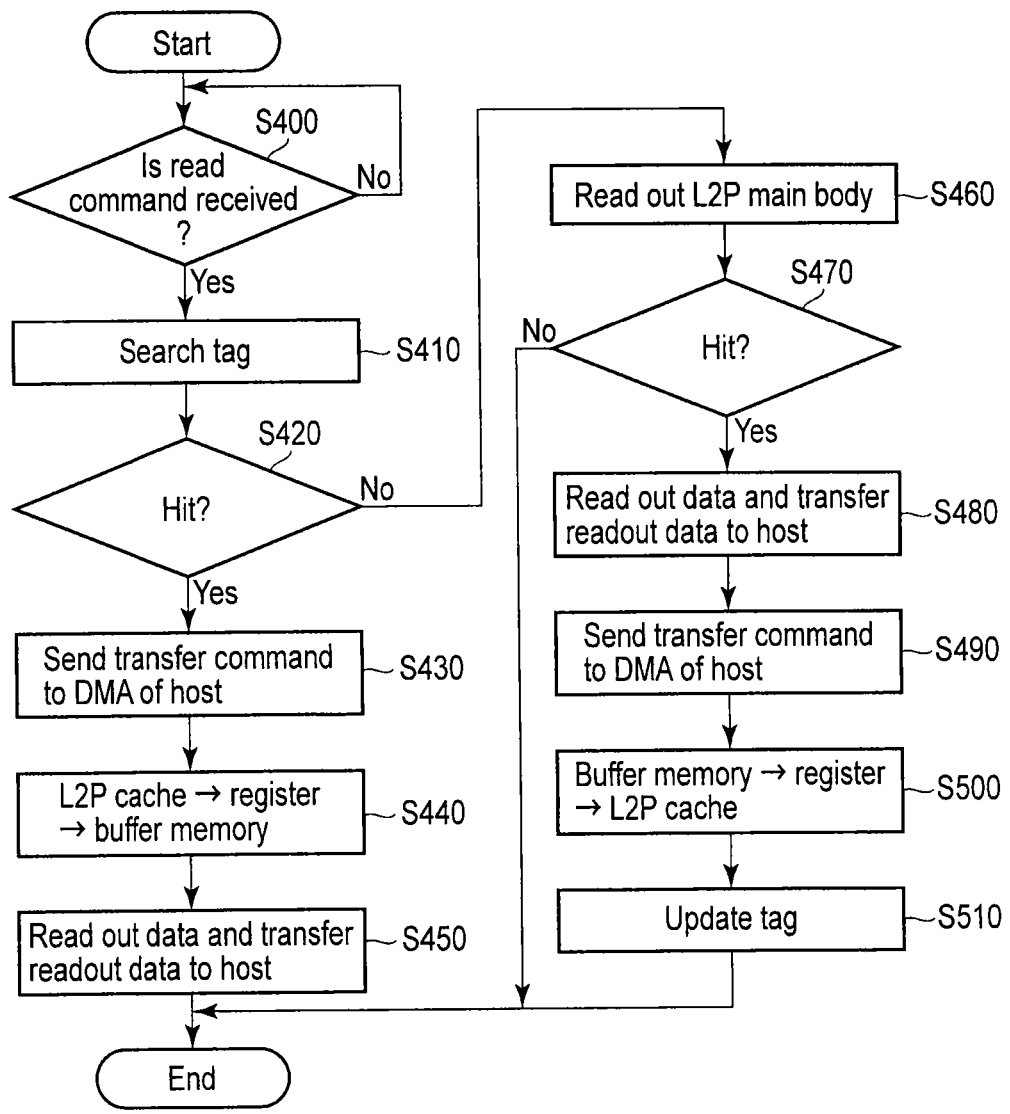
FIG. 12 is a flowchart showing an example of operations of the semiconductor memory device and the information processing device in a read process according to the third embodiment.

FIG. 12 shows an example of an operation procedure of the memory system 40 when a read command is received. When the memory system 40 is received a read command via the storage interface 49, the storage interface 49 sets the received read command in the command queue 46a of the buffer memory 46 (step S400). When this read command becomes executable, the storage controller 48 searches the tag information 46b for an LBA included in the read command (step S410), and determines whether the LBA included in the read command hits in the tag information 46b (step S420). If the LBA hits (Yes in step S420), the storage controller 48 outputs an L2P transfer command to the DMA controller 35 of the host 30 (step S430). The DMA controller 35 transfers the hit L2P information stored in the L2P cache 33a of the main memory 33 from the main memory 33 to the register 34a of the storage interface 34. The storage interface 49 transfers the L2P information set in the register 34a to the buffer memory 46 in the same manner as described earlier (step S440).

The storage controller 48 performs address resolution by using the L2P information transferred to the buffer memory 46. That is, the storage controller 48 acquires a physical address corresponding to the LBA from the L2P information, and reads out data corresponding to the acquired physical address from the NAND flash 41. The ECC circuit 47 performs a decoding process of ECC processing on the data read out from the NAND flash 41 via the NAND interface 44, and outputs the error-corrected data to the buffer memory 46.

After that, the storage controller 48 outputs the readout data stored in the buffer memory 46 to the host 30.

On the other hand, if the LBA included in the read command does not hit the tag information 46b in step S420 (No in step S420), the storage controller 48 reads out part of or all of L2P main body stored in the NAND type flash memory 41 to the buffer memory 46, and executes searching (step S460). If the LBA does not hit the L2P main body, the storage controller 48 terminates the read process, and returns an error to the host 30. If the LBA hits the L2P main body (step S470), the storage controller 48 performs address resolution by using the hit L2P information. That is, the storage controller 48 acquires a physical address corresponding to the LBA from the L2P information, and reads out data corresponding to the acquired physical address from the NAND flash 41. The ECC circuit 47 performs a decoding process of ECC processing on the data read out from the NAND flash 41 via the NAND interface 44, and outputs the error-corrected data to the buffer memory 46. After that, the storage controller 48 outputs the readout data stored in the buffer memory 46 to the host 30 (step S480).

The storage controller 48 commands the storage interface 49 to transfer, to the register 34a of the storage interface 34, L2P information corresponding to the LBA included in the read command, or L2P information corresponding to a peripheral LBA including the LBA included in the read command, from the L2P main body 42 read out to the buffer memory 46. Also, the storage controller 48 outputs, to the DMA controller 35 of the host 30, a transfer command for transferring the L2P information. The storage interface 49 sets, in the register 34a of the storage interface 34, the L2P information buffered in the buffer memory 46. The DMA controller 35 transfers the L2P information set in the register 34a to the main memory 33, and caches the L2P information in the L2P cache. In response to this, the storage controller 48 updates the tab information 46b of the buffer memory 46.

Note that the work area 33c formed on the main memory 33 is also used as a work area for performing, e.g., the block rearrangement and RMW described previously. Note also that the memory system 40 has the tag information 46b of the L2P cache 33a in the third embodiment, but the memory system 40 need not have the tag information 46b and may directly search the L2P cache 33a. Furthermore, the storage interface 49 of the memory system 40 performs data transfer between the register 34a and buffer memory 46 in the third embodiment, but the storage controller 48 may perform this data transfer. It is also possible to perform data transfer directly between the main memory 33 and buffer memory 46.

In the third embodiment as described above, the main memory 33 of the host 30 is used as the storage area of the write cache 33b and L2P cache 33a. Therefore, the memory capacity of the buffer memory 46 can be reduced. In addition, in the third embodiment, a write command and write data are separated when write is requested, the write data is stored in the main memory 33 of the host 30, and the write command is stored in the buffer memory 46 of the memory system. When the memory system 40 executes the write command, the write data is read out from the main memory 33 of the host 30, and written in the NAND flash 41. When compared to an operation in which a write command and write data are not separated, therefore, the interface band width between the host 30 and memory system 40 can be reduced. That is, when a write command and write data are not separated, the host transfers the write command and write data to the memory system when write is requested. Then, the memory system separates the write command from write data, and transfers the separated write data to the main memory 33 of the host 30. When executing the write command, the memory system reads out the write data from the main memory of the host, and writes the readout data in the NAND flash. In this operation, the write data is transferred through the bus between the host and memory system three times for one write request, and this increases the interface band width. By contrast, the arrangement of this embodiment can solve this problem.

Note that when activating the memory system 40, the L2P main body 42 stored in the NAND flash 41 may also be loaded into the main memory 33 of the host 30. Note also that it is possible to form a primary cache of L2P information in the memory system 40, form a secondary cache of L2P information in the main memory 33 of the host 30, and search the L2P main body 42 stored in the NAND flash 41 if there is no hit in the primary and secondary caches.

Furthermore, in the third embodiment, the work area 33c to be used by the storage controller 48 of the memory system 40 is formed on the main memory 33. This makes it possible to reduce the capacity and occupied area of the buffer for the work area in the memory system 40.

In the third embodiment as explained above, the capacity of the buffer memory 46 of the main memory 40 can be reduced without increasing the interface band width between the host 30 and memory system 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising a host device and a semiconductor memory device,
    the host device comprising a main memory, and
    the semiconductor memory device comprising
    a nonvolatile semiconductor memory which stores first address conversion information and data,
    a memory unit which stores second address conversion information, the second address conversion information being part of the first address conversion information, and
    a controller which accesses the nonvolatile semiconductor memory by referring to the second address conversion information,
    wherein third address conversion information is stored in the main memory, the third address conversion information being part of or all of the first address conversion information, and the controller uses the third address conversion information when accessing the nonvolatile semiconductor memory if address conversion information to be referred is not stored in the second address conversion information.

2. The device according to claim 1, wherein
    the controller, when using the third address conversion information, refers to the address conversion information to be referred stored in the third address conversion information after transferred to the second address conversion information.

3. The device according to claim 1, wherein
the nonvolatile semiconductor memory further comprises a Dynamic Memory Access (DMA) controller, and
the DMA controller transfers address conversion information from the third address conversion information to the second address conversion information.

4. The device according to claim 1, wherein
the host device secures an area of the main memory, read part of or all of the first address conversion information stored in the nonvolatile semiconductor memory, and stores the read part of or all of the first address conversion information as the third address conversion information in the secured area of the main memory.

5. The device according to claim 1, wherein
the controller, when the address conversion information to be referred is not stored in the second address conversion information, executes an interrupt to the host device and acquires the address conversion information to be referred from the third address conversion information.

6. The device according to claim 1, wherein
the host device, when the address conversion information to be referred is not stored in the main memory, acquires the address conversion information to be referred from the first address conversion information.

7. A semiconductor memory device comprising:
a nonvolatile semiconductor memory which stores first address conversion information and data,
a memory unit which stores second address conversion information, the second address conversion information being part of the first address conversion information, and
a controller which accesses the nonvolatile semiconductor memory by referring to the second address conversion information,
wherein the controller refers to second address conversion information to be referred acquired from an external of the semiconductor memory device and accesses the nonvolatile semiconductor memory when accessing the nonvolatile semiconductor memory if address conversion information to be referred is not stored in the second address conversion information.

8. The device according to claim 7, further comprising a Dynamic Memory Access (DMA) controller,
wherein the DMA controller acquires the address conversion information to be referred from the external of the semiconductor memory device.

* * * * *